E. LUCK.
NUT LOCK.
APPLICATION FILED JUNE 4, 1919.

1,350,165.

Patented Aug. 17, 1920.

Witnesses

Inventor
Emil Luck

By Richard Brown,
Attorney

UNITED STATES PATENT OFFICE.

EMIL LUCK, OF CLARA CITY, MINNESOTA.

NUT-LOCK.

1,350,165.   Specification of Letters Patent.   Patented Aug. 17, 1920.

Application filed June 4, 1919. Serial No. 301,635.

*To all whom it may concern:*

Be it known that I, EMIL LUCK, a citizen of the United States, residing at Clara City, in the county of Chippewa and State of Minnesota, have invented certain new and useful Improvements in Nut-Locks, of which the following is a specification.

This invention relates to nut locks and the primary object is to provide an improved device for effectively maintaining a nut in locked position on the end of a bolt.

The invention contemplates the provision of a simple arrangement of coöperative complementary parts adapted to be received in slotted portions of the bolt and nut and arranged to automatically move into operative position when the nut assumes a certain position on the bolt so that the nut will be effectively held against accidental or casual displacement.

A further object of the invention is to provide a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 1:
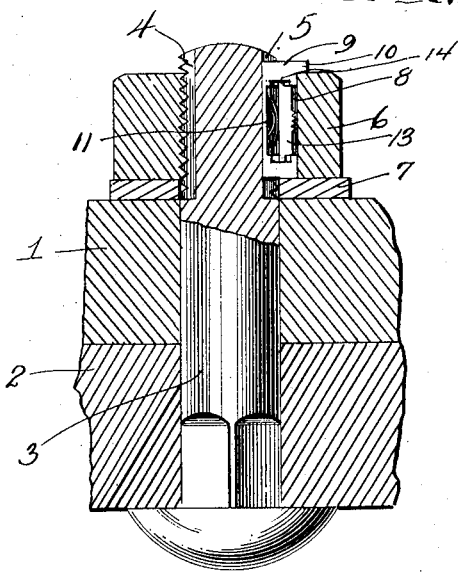
Figure 1 is a longitudinal section through the device constructed in accordance with my invention.
Figure 2:
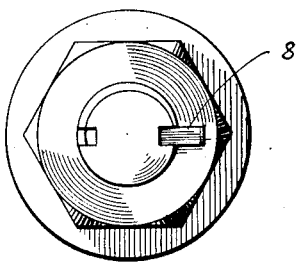
Fig. 2 is an end elevation thereof.

Referring to the drawings, the elements 1 and 2 indicate two separate parts which may be fastened together by a bolt and nut and each is provided with an opening through which the bolt 1 is extended. The shank of the bolt has one end screw threaded in the usual manner and it is provided with diametrically opposite longitudinally extending slots 4 and 5 which may be of any desired length. The nut 6 which is mounted upon the screw threaded shank of the bolt is of the usual formation and a washer 7 may be interposed between the nut 6 and the adjacent member 1.

The nut is provided with an axially extending groove which projects radially into the nut and communicates with the screw threaded opening, the radial depth of the groove, indicated at 8, being sufficient to conveniently receive a locking member which will presently appear.

Figure 3:
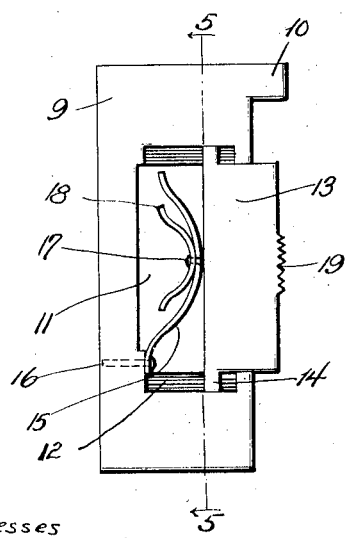
Fig. 3 is a detail view of the locking plate.
Figure 4:
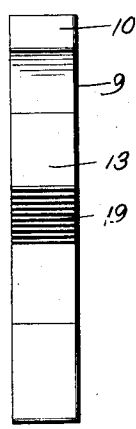
Fig. 4 is an edge elevation of the same.
Figure 5:
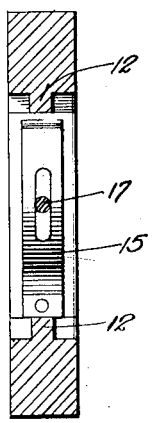
Fig. 5 is a section on the line 5—5 of Fig. 3.

As shown in detail in Figs. 3, 4 and 5, the plate 9 is of substantially rectangular formation and has one corner provided with a lug 10. A central substantially rectangular opening 11 is provided in the plate 9 and the end edges of this opening are cut to provide ridges 12. Mounted in the opening 11 is a sliding locking plate 13 which has projections 14 slotted to receive the ridges 12 so that the plate 13 may be laterally slid in the opening 11, the members 14 and 12 serving as guides for the plate 13. Attached to one wall of the opening 11 in the plate 9 is a flat spring 15 which is secured as indicated at 16 and which is joined intermediate its ends, to one edge of the plate 13 as indicated at 17. This spring in order that it may have the desired resiliency is constructed in two parts, 15 and 18, the part 18 being smaller than the part 15 and fixed, intermediate its ends, to the fastening member 17 as shown to advantage in Fig. 3. The opening 11 communicates with one edge of the plate 9 and the spring normally urges the locking plate 13 outwardly through the open side as indicated in Fig. 3. The plate 13 however, may be pressed inwardly so that the complementary locking plates 9 and 13 may be placed in the alined grooves in the nut and bolt. The edge of the plate 13, opposite the fastening element 17 is provided with or is otherwise suitably roughened as indicated at 19 to prevent slipping of the plate when the device is in use.

In use, the nut is mounted upon the screw threaded shank of the bolt and turned until either one of the openings or slots 4 or 5 is in registration with the slot 8 in the nut. The locking member is then mounted in position, the plate 13 being compressed against the action of the spring 15 and 18 so that the plates may be dropped into the slot. This causes a pressure of the spring to be exerted on the complementary locking plate 13 so that it is urged outwardly through the open end of the opening 11 and it is thus projected into the slot in the nut so that removal or turning of the nut on the bolt will be prevented and any accidental or casual displacement of the nut will be impossible.

The foregoing description and accompanying drawings have reference to what might be considered to be the approved or preferred form of my invention. I desire it to be understood that I may make such changes in construction, combination and arrangement of parts, materials, dimensions, et cetera, as may prove expedient and fall within the scope of the appended claims.

Having thus fully described my invention what I claim as new and desire to secure by Letters Patent is:—

1. A locking device including a sectional locking member adapted to be suitably accommodated between the threaded shank of a bolt and a nut carried thereby, one section of said member comprising a main plate having a side opening and a smaller opening, the latter being cut through one edge of the plate and constituting an exit from said larger opening, the other section comprising a slidable locking plate adapted to fit into and be slidably retained within the large opening of said main plate, said locking plate adapted to be projected through the exit opening of said main plate for locking purposes, guide ridges provided in said side opening, projections carried by said locking plate and engaging said ridges, and means for resiliently positioning said locking plate partly projected from said main plate.

2. The combination with a bolt having a longitudinal groove, and a screw threaded shank, and a nut for the bolt provided with a groove adapted to be mounted upon the shank, the said grooves being adapted to be in registration at certain positions of the said nut on the bolt, of a pair of complementary locking plates, one of the plates having a relatively large opening with the other plate slidably mounted therein, a spring arranged in the opening and normally urging the smaller of the plates outwardly whereby one edge of the smaller plate will project from one longitudinal edge of the larger plate for projecting into the opening in the said nut to maintain the nut and bolt in fixed assembled position.

In testimony whereof I affix my signature in presence of two witnesses.

EMIL LUCK.

Witnesses:
M. S. CARL,
B. C. BEHREND.